United States Patent
Stockley, III

[11] Patent Number: 5,916,613
[45] Date of Patent: Jun. 29, 1999

[54] BARRIER PACKAGE FOR FRESH MEAT PRODUCTS

[75] Inventor: Henry Walker Stockley, III, Spartanburg, S.C.

[73] Assignee: Cryovac, Inc., Duncan, S.C.

[21] Appl. No.: 08/671,097

[22] Filed: Jun. 28, 1996

Related U.S. Application Data

[63] Continuation of application No. 08/268,408, Jun. 30, 1994, abandoned.

[51] Int. Cl.$^6$ .............................. A21D 10/02; A23B 1/00; B65D 81/28
[52] U.S. Cl. ...................... 426/124; 426/129; 426/396; 426/415; 206/213.1
[58] Field of Search ................... 426/129, 124, 426/396, 415; 206/213.1

[56] References Cited

U.S. PATENT DOCUMENTS

| | | | |
|---|---|---|---|
| Re. 27,872 | 1/1974 | Esty | 229/14 B |
| Re. 30,009 | 5/1979 | Perdue et al. | 53/433 |
| 2,623,826 | 12/1952 | Grinstead | 93/174 |
| 2,925,346 | 2/1960 | Harper et al. | 99/174 |
| 3,360,382 | 12/1967 | Miller | 99/174 |
| 3,438,507 | 4/1969 | Kreuger | 426/129 |
| 3,491,504 | 1/1970 | Young et al. | 53/22 |
| 3,574,642 | 4/1971 | Weinke | 99/174 |
| 3,681,092 | 8/1972 | Titchenal et al. | 99/174 |
| 3,713,849 | 1/1973 | Grindrod et al. | 99/174 |
| 3,835,618 | 9/1974 | Perdue | 53/112 |
| 3,950,919 | 4/1976 | Perdue | 53/22 |
| 3,966,045 | 6/1976 | Perdue | 206/443 |
| 3,974,722 | 8/1976 | Floriah | 83/1 |
| 4,522,835 | 6/1985 | Woodruff et al. | 426/264 |
| 4,611,456 | 9/1986 | Gillio-tos et al. | 53/427 |
| 4,833,862 | 5/1989 | Bortolani et al. | 53/427 |
| 4,847,148 | 7/1989 | Schirmer | 428/332 |
| 4,881,359 | 11/1989 | Schirmer | 53/427 |
| 4,886,690 | 12/1989 | Davis et al. | 428/36 |
| 4,889,731 | 12/1989 | Williams, Jr. | 426/106 |
| 4,901,505 | 2/1990 | Williams, Jr. | 53/412 |
| 4,910,033 | 3/1990 | Bekele et al. | 426/129 |
| 4,935,089 | 6/1990 | Schirmer | 156/272 |
| 4,956,212 | 9/1990 | Bekele | 428/36 |
| 5,048,268 | 9/1991 | Brembilla et al. | 53/511 |
| 5,076,436 | 12/1991 | Bortolani et al. | 206/524 |
| 5,087,462 | 2/1992 | Bekele et al. | 426/129 |
| 5,129,512 | 7/1992 | Garwood | 206/213.1 |
| 5,206,075 | 4/1993 | Hodgson, Jr. | 428/216 |
| 5,241,031 | 8/1993 | Mehta | 526/348 |
| 5,272,236 | 12/1993 | Lai et al. | 526/348 |
| 5,278,272 | 1/1994 | Lai et al. | 526/348 |
| 5,279,872 | 1/1994 | Ralph | 428/34 |

FOREIGN PATENT DOCUMENTS

| | | |
|---|---|---|
| 245774 | 2/1963 | Australia. |
| 1186978 | 4/1970 | United Kingdom. |
| 1199998 | 7/1970 | United Kingdom. |
| 1378140 | 12/1974 | United Kingdom. |
| WO 88/01592 | 3/1988 | WIPO. |
| 9001005 | 2/1990 | WIPO. |
| WO 90/03414 | 4/1990 | WIPO. |
| WO 93/03093 | 2/1993 | WIPO. |

OTHER PUBLICATIONS

US Deter. of Branching . . . J. Polymer Science 441–455.

*Primary Examiner*—Jeffrey Stucker
*Assistant Examiner*—Hankyel T. Park
*Attorney, Agent, or Firm*—Rupert B. Hurley, Jr.

[57] ABSTRACT

A package comprising a product support member, an $O_2$-permeable film over the product support member, and an $O_2$-impermeable film over the $O_2$-permeable film and in close proximity to the $O_2$-impermeable film, has an $O_2$-permeable region between the $O_2$-permeable film and the $O_2$-impermeable film. The $O_2$-impermeable film bounds at least a portion of an confined-$O_2$ volume within the package. The confined-$O_2$ volume comprises a gas comprising an amount of gaseous oxygen effective to inhibit discoloration of the product.

32 Claims, 4 Drawing Sheets

BARRIER PACKAGE FOR FRESH MEAT PRODUCTS

This application is a continuation of application Ser. No. 08/268,408, filed Jun. 30, 1994, now abandoned.

FIELD OF THE INVENTION

The present invention relates to packages for fresh meat products, especially fresh red meat products, and particularly to such packages containing a relatively high content of gaseous oxygen, and having an outer film which is impermeable to gaseous oxygen. The high $O_2$ content of the package substantially eliminates discoloration of the meat product, and extends the shelf life of the product.

BACKGROUND OF THE INVENTION

In vacuum skin packaging, a product to be packaged is placed on a product supporting member. The product serves as the mold for a thermoformable polymeric film. The thermoformable film is formed about the product by means of differential air pressure. However, the term "vacuum skin packaging" (hereinafter, "VSP") refers to not only the fact that the thermoformable film is formed around the product by vacuum or differential air pressure, but also to the fact that the product is packaged under vacuum, with the volume containing the product being evacuated during the packaging.

In conventional skin packaging, a porous or perforated backing board is employed, so that a vacuum may be drawn directly through the backing board. However, vacuum skin packaging processes generally use a vacuum chamber with an open top. The product (on an impermeable backing board through which vacuum is not drawn), is placed on a platform within the vacuum chamber. The top of the chamber is covered by a sheet of film which is clamped tightly against the chamber to form an air-tight closure. The chamber is evacuated while the film is heated to its forming and softening temperature. The platform is then raised to drive the product into the softened film, and air pressure can be used about the film to force it tightly around the product.

In vacuum skin packaging, it is also known to release the vacuum and allow ambient air into the chamber, after the chamber has been evacuated and the product driven into the heat-softened film, or vice versa. In this manner, the thermoplastic film molds more or less over and against the product, since there is a vacuum inside the package, and ambient air pressure, or more than ambient air pressure, immediately outside of the package.

Also known are packages for meats, which include an inner $O_2$-permeable film and an outer $O_2$-impermeable film, with the package being either gas flushed or evacuated. For marketing, the outer $O_2$-impermeable member is removed and the inner package is displayed at the meat counter for the consumer. Being $O_2$-permeable, the inner wrapper admits $O_2$ to the interior of the package, causing the fresh meat product to change to a bright red color, i.e., "bloom", which the consumer associates with freshness. The inner film of the package is a polyethylene film, and the outer film may be cellophane film with a coating of saran (vinylidene chloride copolymer, i.e., "PVDC"). Peelable outer $O_2$-impermeable films are known for use on such packages.

It is known to flush a package with $O_2$ gas in order to provide the desired bright red "bloom" of the meat. However, at locations where the $O_2$-impermeable film (i.e., an oxygen barrier film) prevents $O_2$ from access to the surface of the meat, the meat becomes discolored due to the lack of $O_2$ available to bloom the meat.

It would be desirable to develop an $O_2$-impermeable package comprising a meat product, in which the meat product did not become discolored due to a lack of $O_2$ caused by one or more $O_2$-impermeable components in relatively close proximity to the meat. For example, in the packaging of a 1 inch thick beef steak on a 0.7 inch deep polystyrene foam tray, it would be desirable to provide a high oxygen atmosphere within the package to keep the meat bloomed in order to both extend shelf life and maximize the appearance to the customer.

Furthermore, even having two films over the meat, i.e., an $O_2$-permeable film over the meat and in direct contact with the meat, and an $O_2$-impermeable film over the $O_2$-permeable film, without more, does not solve the problem, i.e., the surface of the meat does not remain bloomed because gaseous oxygen cannot reach the surface of the meat.

SUMMARY OF THE INVENTION

The present invention provides a package for fresh red meat products wherein meat discoloration (due to lack of bloom), normally associated with an $O_2$-impermeable film in close proximity to the meat, is substantially inhibited or eliminated even though the $O_2$-impermeable film is in close proximity to the surface of the meat product. This result is accomplished by providing between the $O_2$-impermeable film and the $O_2$-permeable film, an $O_2$-permeable region which provides a physical passageway for the transmission of gaseous oxygen therewithin and therethrough, so that the gaseous oxygen is available to the entire surface of the $O_2$-permeable film which is in contact with the meat, thereby allowing that portion of the meat surface in contact with the $O_2$-permeable film to remain in a state of bloom, i.e., provide the desired appearance to the meat. In this manner, in a package comprising a high-$O_2$ atmosphere, two films, i.e., a combination of an inner $O_2$-permeable film and an outer $O_2$-impermeable film, can be stretched over and contact the upper surface of a meat product which has a height greater than, for example, the tray within which it is packaged, without resulting in loss of bloom to that portion of the upper surface of the meat in contact with the $O_2$-permeable film.

In one aspect, the present invention relates to a package comprising a product support member, an $O_2$-permeable film over the product support member, an $O_2$-impermeable film over the $O_2$-permeable film, and an $O_2$-permeable region between the $O_2$-permeable film and the $O_2$-impermeable film. The $O_2$-impermeable film is in close proximity to the $O_2$-impermeable film. The $O_2$-impermeable film bounds at least a portion of an $O_2$-confining interior volume within the package. The $O_2$-confining interior volume comprises a gas comprising an amount of gaseous oxygen effective to inhibit discoloration of the product.

In another aspect, the present invention pertains to a packaged meat product, comprising a meat product within a package. The package comprises a meat product support member, an $O_2$-permeable film over the meat product support member, an $O_2$-impermeable film over the $O_2$-permeable film, and an $O_2$-permeable region between the $O_2$-permeable film and the $O_2$-impermeable film. The $O_2$-impermeable film is in close proximity to the $O_2$-impermeable film. The $O_2$-impermeable film bounds at least a portion of an $O_2$-confining interior volume within the package. The $O_2$-confining interior volume comprises a gas comprising an amount of gaseous oxygen effective to inhibit discoloration of the product.

The present invention is advantageous in that it reduces the need for a tray wall height which exceeds the height of the product in order to keep the impermeable film from coming into close proximity to the product. Furthermore, it has been discovered that the $O_2$-permeable region can comprise particulates of relatively small particle size, in relatively small amounts, which are effective to provide adequate access of gaseous oxygen to the entire upper surface of the product, while maintaining a desirable level of optics in the package, i.e., without causing a "cloudy appearance", and without obscuring the product to an undesirable degree. The particulates can be present in a size and amount which is substantially invisible to the consumer, while still being effective to prevent discoloration of the product.

DETAILED DESCRIPTION OF THE INVENTION

Figure 1:
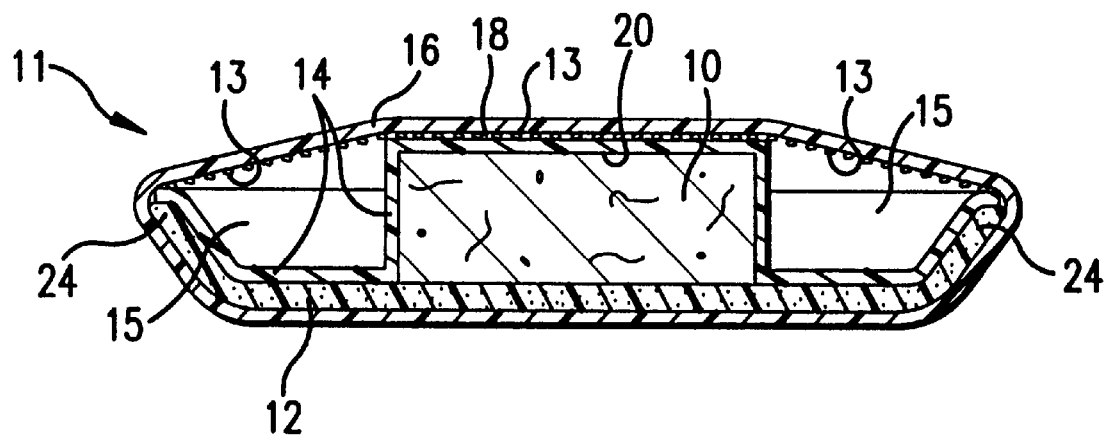
FIG. 1 illustrates a schematic cross-sectional view of a package according to the present invention, the package having a product therein.

The invention relates to a package for meat products, especially fresh red meat products, wherein the package comprises an $O_2$-impermeable film in close proximity to the upper surface of the meat product. The package is flushed with $O_2$, i.e., has a gaseous oxygen content substantially higher than the gaseous oxygen content of the atmosphere. The package comprises means to maintain bloom of the meat product in a region of close proximity of the upper surface of the meat product to the $O_2$-impermeable film, i.e., to substantially inhibit discoloration of the meat product in the area in which the $O_2$-impermeable film is in close proximity to the meat.

As used herein, the term "package" refers to the combination of all of the various components used in the packaging of a product, i.e., all components of the packaged product other than the product within the package. The package is inclusive of, for example, a rigid support member, all films used to surround the product and/or the rigid support member, an absorbent component such as a soaker pad, and even the atmosphere within the package, together with any additional components used in the packaging of the product.

As used herein, the phrase "packaged meat product" refers to any product at least a portion of which comprises meat, the product being contained in a package.

As used herein, the phrase "product-containing package" refers to a package having a product contained therein.

As used herein, the phrase "product support member" refers to a component of a package on which a product is directly placed, i.e., immediately under the product, which the product directly contacts. Meat products are typically supported on a tray-like package component, typically comprising expanded polystyrene sheet material, which may be thermoformed into a tray or other shape, for supporting the meat product.

As used herein, the phrase "over the product support member" refers to the position of a package component which is over the product when the product is in an upright position.

As used herein, the phrase "over the $O_2$-permeable film" refers to the position of a package component which is over an $O_2$-permeable film, which, in turn, is positioned over the product when the package is in the upright position.

As used herein the phrase "in close proximity to the $O_2$-impermeable film" refers to the position of a package component which is over the $O_2$-permeable film and which has a surface thereof very close to the $O_2$-permeable film; preferably, within about 0.01 to 20 mils from the $O_2$-permeable film; more preferably, 0.05 to 5 mils; still more preferably 0.4 to 2 mils.

As used herein the phrase "in close proximity to the product" refers to any component of a package which has a surface thereof within about 0–20 mils from the surface of the product.

As used herein, the phrase "confined-$O_2$ volume within the package" refers to that volume within the package which is completely bounded by at least one $O_2$-impermeable package component, for example, an $O_2$-impermeable film. In contrast, as used herein, the phrase "nonconfined-$O_2$ volume within the package" refers to that volume within the package, if any, which is not completely and separately bounded by one or more $O_2$-impermeable components of the package.

As used herein, the phrase "supplemental product support member" refers to a package component in addition to the product support member in direct contact with the product.

As used herein, the phrase "meat contact layer", refers to a layer of a multilayer film which is in direct contact with the meat-containing product being packaged by the film. The meat-contact layer is an outer film layer, in order to be in direct contact with the meat product. The meat-contact layer is an inside layer in the sense that with respect to the package and the meat product therein, the meat-contact layer is an outer film layer in direct contact with the meat.

As used herein, the phrase "meat contact surface" refers to the outer surface of a meat-contact layer of a film which is in direct contact with the meat product in the package.

As used herein, "EVOH" refers to ethylene vinyl alcohol copolymer. EVOH includes saponified or hydrolyzed ethylene vinyl acetate copolymer, and refers to vinyl alcohol copolymer having an ethylene comonomer, and prepared by, for example, hydrolysis of vinyl acetate copolymer, or by chemical reaction with polyvinyl alcohol. The degree of hydrolysis is preferably at least 50% and more preferably at least 85%.

As used herein, the phrase "oxygen transmission rate", also referred to as "OTR" and "oxygen permeability", is measured according to ASTM D3985, a test known to those of skill in the art, and which is hereby incorporated by reference thereto, in its entirety.

As used herein, the term "lamination", and the phrase "laminated film", refer to the process, and resulting product, made by bonding together two or more films or other materials. Lamination can be accomplished by joining films together with adhesives, joining with heat and pressure, and even spread coating and extrusion coating. The term laminate is also inclusive of coextruded multilayer films comprising one or more tie layers.

As used herein, the term "oriented" refers to a polymer-containing material which has been stretched at an elevated temperature (the orientation temperature), followed by being "set", while in the stretched configuration, by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which a thermoplastic film is expanded in several directions, usually two directions perpendicular to one another. Expansion in the machine direction is herein referred to as "drawing", whereas expansion in the transverse direction is herein referred to as "stretching". The degree of orientation is also referred to as the orientation ratio, or sometimes as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can comprise a composition comprising one or more polymers.

As used herein, the term "homopolymer" is used with reference to a polymer resulting from the polymerization of a single monomer, i.e., a polymer consisting essentially of a single type of repeating unit.

As used herein, the term "copolymer" refers to a polymer formed by the polymerization reaction of at least two different monomers. For example, the term "copolymer" includes the copolymerization reaction product of ethylene and an alpha-olefin, such as 1-hexene. However, the term "copolymer" is also inclusive of terpolymer, quadripolymer, etc. For example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization processes, gas phase polymerization processes, and high pressure polymerization processes.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer copolymerizes in a higher weight or molar percent. However, the first listed monomer preferably is polymerized in a higher weight percent than the second listed monomer, and, for copolymers which are terpolymers, quadripolymers, etc., preferably, the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/alpha-olefin copolymer"), identifies the comonomers which are copolymerized to produce the copolymer. Such a phrase as "ethylene alpha-olefin copolymer" is the respective equivalent of "ethylene/alpha-olefin copolymer." As used herein, the chemical species identified immediately before the "/" is preferably, but not necessarily, present in a weight percent greater than the chemical species identified immediately after the "/".

As used herein, the phrase "heterogeneous polymer" refers to polymerization reaction products of relatively wide variation in molecular weight, and relatively wide variation in composition distribution, i.e. polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "homogeneous polymer" refers to polymerization reaction products of relatively narrow molecular weight distribution and relatively narrow composition distribution. Although the phrase "homogeneous polymer" is used with respect to the structural characteristics of such polymers, i.e., structural characteristics known to those of skill in the art, e.g., as are indicated by the molecular weight distribution, coefficient of distribution breadth index (CDBI) etc., as known to those of skill in the art. The phrase "homogeneous polymer" is, at the same time, indicative of the manner in which the polymer is made, i.e., through the use of a "single-site catalyst". Homogeneous polymers exhibit a relatively even sequencing of comonomers within a chain, a relative mirroring of sequence distribution in all chains, and a relative similarity of length of all chains, and are typically prepared using metallocene, or other single-site type catalysis.

For example, homogeneous ethylene/alpha-olefin copolymers have structural characteristics, such as a particular range of molecular weight distribution ($M_w/M_n$), CDBI, and narrow melting point range and single melt point behavior. The molecular weight distribution ($M_w/M_n$), also known as polydispersity, may be determined by gel permeation chromatography. Homogeneous ethylene/alpha-olefin copolymers generally have a ($M_w/M_n$) of less than 2.7. Preferably, the ($M_w/M_n$) will have a range of about 1.9 to 2.5. More preferably, the ($M_w/M_n$) will have a range of about 1.9 to 2.3. The CDBI of such homogeneous ethylene/alpha-olefin copolymers is generally greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. CDBI is determined via the technique of Temperature Rising Elution Fractionation (TREF). CDBI determination clearly distinguishes the homogeneous copolymers (narrow composition distribution as assessed by CDBI values generally above 70%) other available polymers which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.,* Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers also exhibit a relatively narrow melting point range, in comparison with "heterogeneous copolymers", i.e., polymers having a CDBI of less than 55%. Preferably, homogeneous ethylene/alpha-olefin copolymers exhibit an essentially singular melting point characteristic, with a peak melting point ($T_m$), as determined by Differential Scanning Colorimetry (DSC), of from about 60° C. to 110° C. Preferably, homogeneous copolymers have a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing homogeneous ethylene/alpha-olefin copolymers are disclosed in U.S. Pat. No. 5,206,075, to HODGSON, Jr.; U.S. Pat. No. 5,241,031, to MEHTA; PCT International Publication Number WO 93/03093, in the name of Exxon Chemical Company; PCT International Publication Number WO 90/03414, in the name of Exxon Chemical Patents, Inc., all four of which are hereby incorporated in their entireties, by reference there. Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated in their entireties, by reference thereto.

As used herein, the phrase "homogeneous catalyst" refers to a catalyst suitable for use in the polymerization of homogeneous polymers, as defined above. Homogeneous catalysts are also referred to as "single site catalysts", due to the fact that such catalysts typically have only one type of catalytic site, which is believed to be the basis for the homogeneity of the resulting polymers.

As used herein, the term "polyolefin" refers to any polymerized olefin, which can be linear, branched, cyclic, aliphatic, aromatic, substituted, or unsubstituted. More specifically, included in the term polyolefin are homopolymers of olefins, copolymers of olefins, copolymers of an olefin and an non-olefinic comonomer copolymerizable with the olefin, such as vinyl monomers, modified polymers thereof, and the like. Specific examples include polypropylene homopolymer, polyethylene homopolymer, polybutene, propylene/alpha-olefin copolymer, ethylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc.

The phrase "modified polyolefin resin" includes modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc., which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of compositions comprising a blend of the identified polymer with one or more polymers of a different type.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); as well as homogeneous polymers such TAFMER (TM) ethylene/alpha olefin copolymers supplied by Mitsui Petrochemical Corporation such as metallocene-catalyzed polymers such as EXACT (TM) materials supplied by Exxon. These materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. LLDPE, as used herein, has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY (TM) resins, are also included as another type of ethylene/alpha-olefin copolymer useful in the present invention.

As used herein, the phrase "ionomer resin" refers to a product of an ionic polymerization, i.e., a polymer containing interchain ionic bonding. Preferably, the ionomer comprises at least one member selected from the group consisting of a thermoplastic resin based on metal salt of an alkene/acid copolymer; more preferably, a thermoplastic resin based on metal salt of ethylene/acid copolymer; still more preferably, ethylene/methacrylic acid copolymer. As used herein, the term "ionomer" also includes ethylene/acrylic acid copolymer and ethylene/acid/acrylate terpolymer.

As used herein, the phrases "inner layer" and "internal layer" refer to any layer, of a multilayer film, having both of its principal surfaces directly adhered to another layer of the film.

As used herein, the phrase "inside layer" refers to the outer layer, of a multilayer film packaging a product, which is closest to the product, relative to the other layers of the multilayer film.

As used herein, the phrase "outer layer" refers to any film layer of a multilayer film having only one of its principal surfaces directly adhered to another layer of the film.

As used herein, the phrase "outside layer" refers to the outer layer, of a multilayer film packaging a product, which is furthest from the product relative to the other layers of the multilayer film.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, i.e., modulus, and/or optics, and/or added abuse-resistance, and/or specific impermeability.

As used herein, the phrase "sealant layer", with respect to multilayer films, refers to an outer film layer, or layers, involved in the sealing of the film to itself or another layer. It should also be recognized that in general, the outer 0.5 to 3 mils of a film can be involved in the sealing of the film to itself or another layer. With respect to packages having only fin-type seals, as opposed to lap seals, the phrase "sealant layer" generally refers to the inside film layer of a package, as well as supporting layers adjacent this sealant layer often being sealed to itself, and frequently serving as a food contact layer in the packaging of foods. Preferably, the sealant layer comprises at least one member selected from the group consisting of ethylene/vinyl acetate copolymer, linear low density polyethylene, low density polyethylene, ionomer, and homogeneous ethylene/alpha-olefin copolymer.

As used herein, the phrase "tie layer" refers to any internal layer having the primary purpose of adhering two layers to one another.

As used herein, the phrase "skin layer" refers to an outside layer of a multilayer film in packaging a product, this skin layer being subject to abuse.

As used herein, the phrase "bulk layer" refers to any layer of a film which is present for the purpose of increasing the abuse-resistance, toughness, modulus, etch, of a multilayer film. Bulk layers generally comprise polymers which are inexpensive relative to other polymers in the film which provide some specific purpose unrelated to abuse-resistance, modulus, etc.

As used herein, the term "barrier", and the phrase "barrier layer", as applied to films and/or film layers, is used with reference to the ability of a film or film layer to serve as a barrier to one or more gases. Oxygen barrier layers, i.e., $O_2$ barrier layers, can comprise, for example, ethylene/vinyl alcohol copolymer, polyvinyl chloride, polyvinylidene chloride, polyamide, polyester, polyacrylonitrile, etc., as known to those of skill in the art; preferably, the oxygen barrier layer comprises ethylene/vinyl alcohol copolymer, polyvinyl chloride, polyvinylidene chloride, and polyamide; more preferably, ethylene/vinyl alcohol copolymer.

As used herein, the phrase "abuse layer" refers to an outer film layer and/or an inner film layer, so long as the film layer serves to resist abrasion, puncture, and other potential causes of reduction of package integrity, as well as potential causes of reduction of package appearance quality. Abuse layers can comprise any polymer, so long as the polymer contributes to achieving an integrity goal and/or an appearance goal; preferably, abuse layers comprise polymer having a modulus of at least $10^7$ Pascals, at room temperature; more preferably, the abuse layer comprises at least one member selected from the group consisting of polyamide and polypropylene; more preferably, polyamide, high density polyethylene, and ethylene/propylene copolymer; more preferably, nylon 6, nylon 6/6, amorphous nylon, high density polyethylene, and ethylene/propylene copolymer.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

Although the majority of the above definitions are substantially as understood by those of skill in the art, one or more of the above definitions may be defined hereinabove in a manner differing from the meaning as ordinarily understood by those of skill in the art, due to the particular description herein of the present invention.

FIG. 1 illustrates package 11 having meat product 10 therein, the meat product being on tray 12. $O_2$-permeable film 14 encloses product 10 on tray 12, with $O_2$-impermeable film 16 enclosing $O_2$-permeable film 14, product 10, and tray 12, and defining interior volume 15 within the package. $O_2$-permeable region 18 is disposed between O$_2$-permeable film 14 and O$_2$-impermeable film 16, so that gaseous oxygen, i.e., O$_2$, is accessible to that portion of the surface of meat product 10, e.g., entire top surface 20, to which O$_2$-impermeable film 16 is in close proximity.

In general, the O$_2$-permeable film in the package according to the present invention can be a monolayer film or a multilayer film. More preferably, the O$_2$-permeable film is a multilayer film. In general, this multilayer film can comprise from 2 to 20 layers; preferably, from 3 to 10 layers; and more preferably, from 4 to 8 layers.

In general, the O$_2$-permeable film can have any total thickness desired, so long as the film provides the desired properties for the particular packaging operation in which the film is used. Preferably, the film used in the present invention has a total thickness (i.e., a combined thickness of all layers), of from about 0.3 to 10 mils (1 mil equals 0.001 inch); more preferably, from about 0.6 to 6 mils; and still more preferably, from 1 to 4 mils.

Preferably, the O$_2$-permeable film comprises a polymer or combination of polymers so that the film has an O$_2$ transmission rate of at least 2,000 cc/m$^2$ 24 hr atm @73° F.; more preferably, from about 2,000 to 100,000 cc/m$^2$ 24 hr atm @73° F.; still more preferably, from about 2,000–20,000 cc/m$^2$ 24 hr atm @73° F.; and, yet still more preferably, from about 10,000–15,000 cc/m$^2$ 24 hr atm @73° F. Examples of suitable materials for O$_2$-permeable film 14 include such polyolefins as ethylene/vinyl acetate copolymer, ionomer, ethylene/alpha-olefin copolymer, especially homogeneous ethylene/alpha-olefin copolymer, low density polyethylene, plasticized polyvinyl chloride. SSD-351 (TM) stretch olefin film, obtainable from W. R. Grace & Co.-Conn., of Duncan, S.C, and SSD-310 (TM) stretch olefin film, also obtainable from W. R. Grace & Co.-Conn., of Duncan, S.C, are suitable O$_2$-permeable films for use in the present invention. Materials with still higher permeation rates are available and could provide an extended color life in areas of film-to-meat contact, but higher permeation is not generally necessary.

In general, the O$_2$-permeable film may comprise at least one member selected from the group consisting of polyolefin, and ionomer, e.g., SURLYN (TM) ionomer resin, obtainable from E. I. DuPont de Nemours, of Wilmington, Del.; preferably, the O$_2$-permeable film comprises at least one member selected from the group consisting of polyolefin; more preferably, ethylene/vinyl acetate copolymer ("EVA"), low density polyethylene ("LDPE"), ultra low density polyethylene ("ULDPE"), homogeneous ethylene/alpha-olefin copolymer, ethylene/n-butyl acrylate copolymer ("EnBA"), ethylene/methyl acrylate copolymer ("EMA"), and polymethylpentene. The above-disclosed polymers may be present alone as a single film layer, or may be present in a composition comprising one or more additional polymers substantially uniformly blended therewith.

Figure 7:
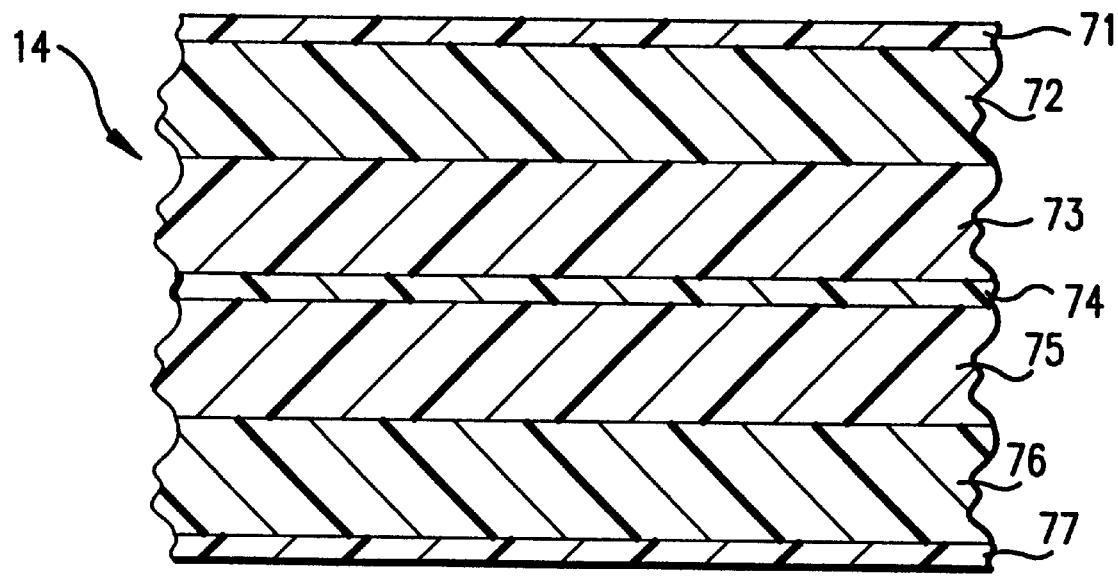
FIG. 7 illustrates an enlarged cross-sectional view of a portion of a preferred $O_2$-permeable film for use in the present invention.

FIG. 7 illustrates, in schematic cross-sectional view, preferred O$_2$-permeable film 14 for use in the package of the present invention. Film 14 has a total of seven layers, and has a thickness of about 6 mils. First layer 71, an outer layer which serves as an abuse layer, preferably has a thickness of about 0.3 mils and is composed of high density polyethylene ("HDPE"). Second layer 72 and third layer 73, each of which is a core layer and each of which serves as a bulk layer, preferably together have a combined thickness of about 2.25 mils, with second layer 72 preferably having a thickness substantially equal to the thickness of third layer 73, and vice versa, i.e., each of layers 72 and 73 having a thickness of about 1.12 mils. Preferably, second layer 72 and third layer 73 are each composed of ethylene/vinyl acetate copolymer ("EVA") having a vinyl acetate content of about 18 weight percent. Fourth layer 74, an core layer which serves as a bulk layer, preferably has a thickness of about 0.75 mils, and is preferably composed of low density LDPE polyethylene ("LDPE"). Fifth layer 75 and sixth layer 76, each of which is a core layer and each of which serves as a bulk layer, preferably together have a combined thickness of about 2.25 mils, with fifth layer 75 preferably having a thickness substantially equal to the thickness of sixth layer 76, and vice versa. Preferably, fifth layer 75 and sixth layer 76 are each composed of ethylene/vinyl acetate copolymer ("EVA") having a vinyl acetate content of about 18 weight percent. Seventh layer 77 is an outer layer which serves as a sealant layer, and preferably has a thickness of about 0.45 mils and preferably is composed of at least one member selected from the group consisting of EVA, LDPE, ionomer, and homogeneous ethylene/alpha-olefin copolymer.

In general, the O$_2$-impermeable film in the package according to the present invention can be a monolayer film or a multilayer film. Preferably, the O$_2$-impermeable film is a multilayer film, preferably comprising from 2 to 20 layers; more preferably, from 3 to 10 layers; and more preferably, from 4 to 6 layers.

In general, the O$_2$-impermeable film can have any total thickness desired, so long as the film provides the desired properties for the particular packaging operation in which the film is used. Preferably, the film used in the present invention has a total thickness (i.e., a combined thickness of all layers), of from about 0.5 to 10 mils (1 mil equals 0.001 inch); more preferably, from about 1 to 8 mils; and still more preferably, from 2 to 6 mils.

In general, the O$_2$-impermeable film can comprise any polymer, or combination of polymers, so that the film has an O$_2$ transmission rate of from about 0 to 500 cc/mil 24 hr atm @73F.; preferably, from about 2 to 100 cc/mil 24 hr atm @73F.; more preferably, from about 2 to 30 cc/mil 24 hr atm @73F.; still more preferably, from about 5 to 10 cc/mil 24 hr atm @73F.

Preferably, the O$_2$-impermeable film comprises, as the O$_2$-barrier composition, at least one member selected from the group consisting of polyvinyl chloride ("PVC"), polyvinylidene chloride ("PVDC"), ethylene/vinyl alcohol copolymer ("EVOH"), polyethylene terephthalate ("PET"), and polyamide; more preferably, the O$_2$-impermeable film comprises at least one member selected from the group consisting of PVDC and EVOH; still more preferably, the O$_2$-impermeable film comprises EVOH. The above-disclosed polymers may be present alone in a single layer of a single film layer, or may be present in admixture with one or more additional polymers.

Figure 8:
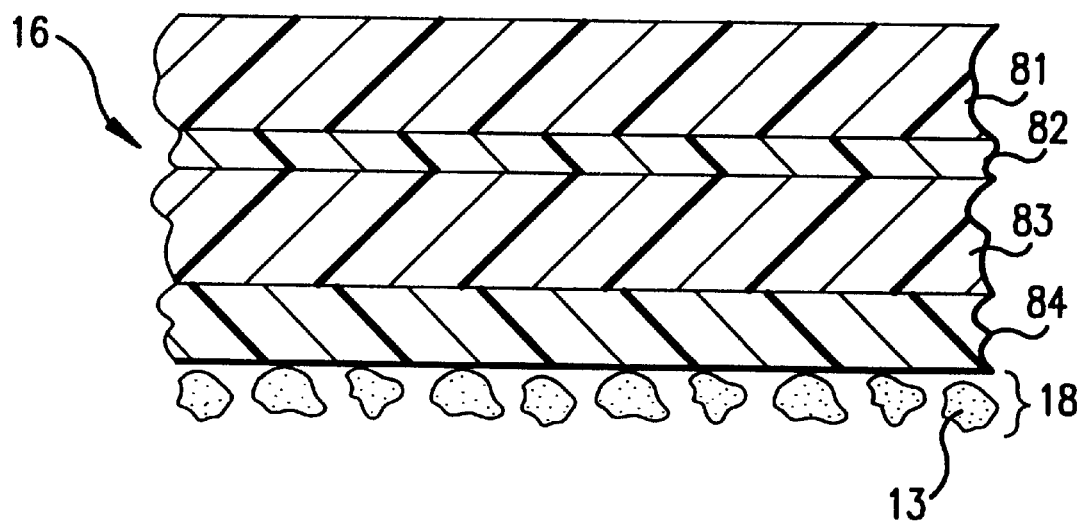
FIG. 8 illustrates an enlarged cross-sectional view of a portion of a preferred $O_2$-impermeable film for use in the present invention, together with a layer of particulates on an inside surface of the $O_2$-permeable film.

FIG. 8 illustrates, in schematic cross-sectional view, preferred O$_2$-impermeable film 16 for use in the package of the present invention. Film 16 has a total of 4 layers, and has a thickness of about 2.4 mils. First layer 81, an outside layer which serves to provide desired optical and abuse properties, preferably has a thickness of about 0.5 mils, and preferably is composed of ethylene/vinyl acetate copolymer ("EVA"), and/or a composition, e.g., blend, comprising EVA and HDPE. Second layer 82, a core layer which serves as a barrier layer, preferably has a thickness of from about 0.2 to 0.4 mils, and preferably is composed of a copolymer of vinylidene chloride and methyl acrylate. Third layer 83, a core layer which serves as a bulk layer, preferably has a thickness of about 1.0 mils, and preferably is composed of EVA. Fourth layer 84, an outer layer which serves as a sealant layer, preferably has a thickness of about 0.5 mils, and preferably is composed of EVA and/or a mixture of EVA and LLDPE.

According to a preferred embodiment of the invention, $O_2$-impermeable film 16 is a heat-shrinkable polyolefin bag or film made of suitable material such as the above listed, and preferably includes a layer or component of cornstarch on the inside surface thereof, which contacts outside surface of underlying $O_2$-permeable film 14 when the $O_2$-impermeable film 16 is applied. Preferably, in a process of preparing the barrier package of the present invention, $O_2$-impermeable film 16 has cornstarch applied on the inside surface thereof, before the barrier package is assembled. Alternatively, or in addition, cornstarch is applied to the outside surface of the $O_2$-permeable film, before the barrier package is assembled.

"Fifth layer 18" is not a layer of film 16. Preferably, "fifth layer 18" represents a particulate-containing region, between $O_2$-permeable film 14 and $O_2$-impermeable film 16, throughout which $O_2$ can freely diffuse Preferably, fifth layer 18 is composed of food starch particulates 13 having a gas therebetween.

The $O_2$-permeable region 18, between $O_2$-permeable film 14 and $O_2$-impermeable film 16, comprises particulate material 13 having gaps therebetween. At a minimum, particulate material 13 is between $O_2$-permeable film 14 and $O_2$-impermeable film 16 in a area wherein $O_2$-permeable film 14 directly contacts meat product 10, to thereby prevent discoloration of meat product 10. In general, particulate material 13 may comprise any composition in a form which permits gaseous oxygen to move between the films and pass through the inner $O_2$-permeable film; preferably, particulate material is approved for use in the packaging of food; more preferably, particulate 13 comprises at least one member selected from the group consisting of cornstarch, silica, tapioca starch, and the like; still more preferably, particulate 13 comprises cornstarch.

In general, particulate material 13, e.g., cornstarch, is present in an amount of from about 1–100 grams per 100 sq.in. of film; preferably, from about 5–20 grams per 100 sq.in.; and, more preferably, in an amount 10 grams per 100 sq.in. Although the cornstarch preferably covers the entire inside surface of $O_2$-impermeable film 16 (because it is easiest to produce the package according to the present invention in this manner), $O_2$-impermeable film 16 could alternatively have the cornstarch layer only on that portion of its inside surface which would otherwise (i.e., without the particulates being present) directly contact that portion of the $O_2$-permeable film which is in direct contact with the meat product. However, providing the particulates 13 on only a region of the inside surface of the $O_2$-permeable film requires that the particulates be applied intermittently, and that the particulate-covered region be aligned with the product during packaging. Both these process steps are less preferred than continuous application of particulates to the inside surface of the $O_2$-impermeable film, because of inherent difficulties in aligning the particulate-covered region with the product.

The "$O_2$-permeable region" is "$O_2$-permeable" at least in that in comprising particulate matter, spaces between the particulates serve as passageways for the transmission of gaseous oxygen throughout the $O_2$-permeable region. In general, the particulates can have any size which permits $O_2$ to freely circulate within $O_2$-permeable region 18; preferably, the particulates are of a particle size of from about 4 to 50 microns; more preferably, from about 8 to 30 microns; still more preferably, about 15 microns, i.e., about 0.6 mils.

Particulates 13 of the $O_2$-permeable region 18 can, in general, be "loose", i.e., unattached to film 16 or film 14. Alternatively, particulates 13 can be adhered to the surface of one or more of films 16 and/or 14. The adhesion can be with an adhesive agent, electrostatically, and/or any other form of adhesion, so long as gaseous $O_2$ can be transmitted between films 14 and 16, i.e. substantially throughout the $O_2$-permeable region, so that the meat product does not exhibit discoloration due to lack of presence of enough gaseous oxygen to cause the meat to bloom.

It has been discovered that region 18 between film 14 and film 16 should be dry, as the presence of moisture can result in blocking the substantially free circulation of gaseous oxygen between film 14 and film 16. That is, moisture between the films, if not taken up by a desiccant, can act as a link between the films, this link acting as a barrier to the transmission of gaseous oxygen throughout region 18 between the films. As a result, under certain circumstances, such as relatively high humidity environments and/or the presence of water from any source, it is preferred that a desiccant be between the two films, to prevent moisture therebetween from acting as a barrier to the free circulation and transmission of gaseous oxygen.

In the vacuum packaging process as described above, although $O_2$-permeable film 14 is drawn down tightly over the product by the application of vacuum, drawing $O_2$-permeable film 14 down tightly against meat product 10 via vacuum does not necessarily draw $O_2$-impermeable film 16 tightly down against $O_2$-permeable film 14. Such is the configuration of product-containing package 11 illustrated in FIG. 1. According to the present invention, the portion of $O_2$-impermeable film 16 which causes discoloration is that portion of $O_2$-impermeable film 16 which is in close proximity to meat product 10. In a typical package, the portion of the meat product so affected will be the top surface 20, as illustrated in FIG. 1. In accordance with the invention, that portion of the package above top surface 20 of meat product 10 additionally includes $O_2$-permeable region 18. Discoloration of top surface 20 of meat product 10 is thereby prevented, despite the close proximity of impermeable film 16 to top surface 20 of meat product 10.

In general, any suitable product support member may be used, either alone, or optionally in combination with one or more supplemental product support members. Preferably, at least one member selected from the group consisting of the product support member, and the supplemental product support member, comprises a tray. Preferably, the tray comprises a thermoformed foam sheet, or a thermoformed or molded rigid sheet tray, or any other support member which may be preformed or formed in-line during packaging. In general, the product support member may comprise any suitable material as known to those of skill in the art, such as polyolefin; preferably, the support member comprises at least one member selected from the group consisting of polyvinylchloride, high density polyethylene, polystyrene, polypropylene, polyethylene terephthalate, and cellulose; more preferably, tray 12 comprises polystyrene; still more preferably, tray 12 comprises polystyrene foam. If the support member is in direct contact with the meat product, preferably the support member is $O_2$-permeable, in order to reduce or substantially eliminate discoloration of any portion of the surface of the meat product in direct contact with the support member.

In accordance with the present invention, meat product 10 may be packaged in a variety of manners. For example, product-containing package 11 as illustrated in FIG. 1 may be prepared by: (1) placing meat product 10 on supporting tray 12; (2) applying $O_2$ permeable film 14 over meat product 10, using conventional processes such as vacuum skin packaging, and the like; (3) sealing $O_2$-permeable film 14 to tray 12 so as to directly contact meat product 10, and enclose meat product 10 within tray 12 and film 14, $O_2$-permeable film 14 being applied by any known method, such as vacuum skin packaging and heat sealing, as is known to those of skill in the art; (4) applying $O_2$ impermeable film 16 over $O_2$ permeable film 14, so that $O_2$-permeable film 14, tray 12, and meat product 10, are enclosed in an $O_2$-confining interior volume. The resulting product-containing package is as illustrated in FIG. 1.

During packaging, interior volume 15 within product-containing packages 11, 25, 27, 28, and 29, is preferably flushed with a high-$O_2$-content gas during application of one or both of $O_2$-permeable film 14 and impermeable film 16. This relatively high $O_2$ content of the flushing gas serves to keep the meat product "bloomed" (e.g., fresh red meats are red when they are bloomed), in order to prevent discoloration of meat product 10, so that packaged meat product 10 is favorably received by the consumer.

The gas flushing step can be performed during the application of $O_2$-permeable film 14 and/or during the application of $O_2$-impermeable film 16, in accordance with conventional and well-known procedures. In general, the flushing gas comprises gaseous oxygen in an amount of at least 60 volume percent, based on the total gas volume of the flushing gas; preferably, the flushing gas comprises $O_2$ at a level of at least about 80 volume percent. Generally the flushing gas comprises gaseous oxygen in admixture with another gas. Although the flushing gas can comprise gaseous oxygen in an amount of about 100 volume percent, based on total gas volume within the package, preferably the flushing gas comprises gaseous oxygen in an amount of from about 80 volume percent to 99 volume percent, based on total gas volume within the package, with the balance or remainder of the gas comprising at least one member selected from the group consisting of gaseous nitrogen and gaseous carbon dioxide. A lower volume percent of $O_2$ can be present, if a shorter shelf life is acceptable. With respect to the mass of the packaged meat product 10, preferably the flushing gas is present in the package at a level of from about 1–5 cc/gm. product; more preferably, from about 1–2 cc/gm. product.

Optionally, the package may further comprise a soaker pad (not illustrated) to absorb product drip loss, and may further prevent or reduce discoloration of meat product 10.

Figure 2:
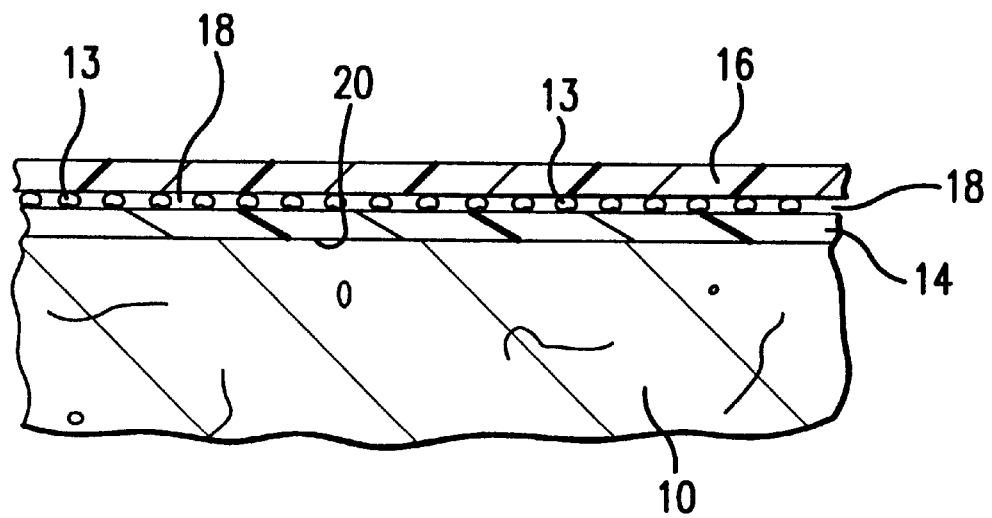
FIG. 2 illustrates an enlarged view of a portion of the package illustrated in FIG. 1.

FIG. 2 illustrates an enlarged view of a portion of FIG. 1. FIG. 2 illustrates the films suitable for use in a package according to the invention, with outer $O_2$-impermeable film 16, inner $O_2$-permeable film 14 having an inside surface in direct contact with meat product 10, and intermediate $O_2$-permeable region 18, between $O_2$-impermeable film 16 and $O_2$-permeable film 14. FIG. 2 illustrates a portion of the package where permeable film 14 is in direct contact with meat product 10, with cornstarch particulates 13 keeping $O_2$-impermeable film 16 in spaced relation from $O_2$-permeable film 14, so as to prevent discoloration of meat product 10, by allowing transmission of gaseous oxygen to meat surface 20. $O_2$-permeable region 18 preferably comprises cornstarch particulates 13 disposed between the films, with passageways between the particulates permitting the flow of gaseous oxygen between the films and throughout $O_2$-permeable region 18, so that $O_2$ can pass through $O_2$-permeable film 14 and maintain bloom on surface 20 of meat product 10. In this manner, cornstarch particulates 13 allow gaseous oxygen to reach meat product 10 even at areas of close proximity of impermeable film 16 with meat product 10.

Figure 3:
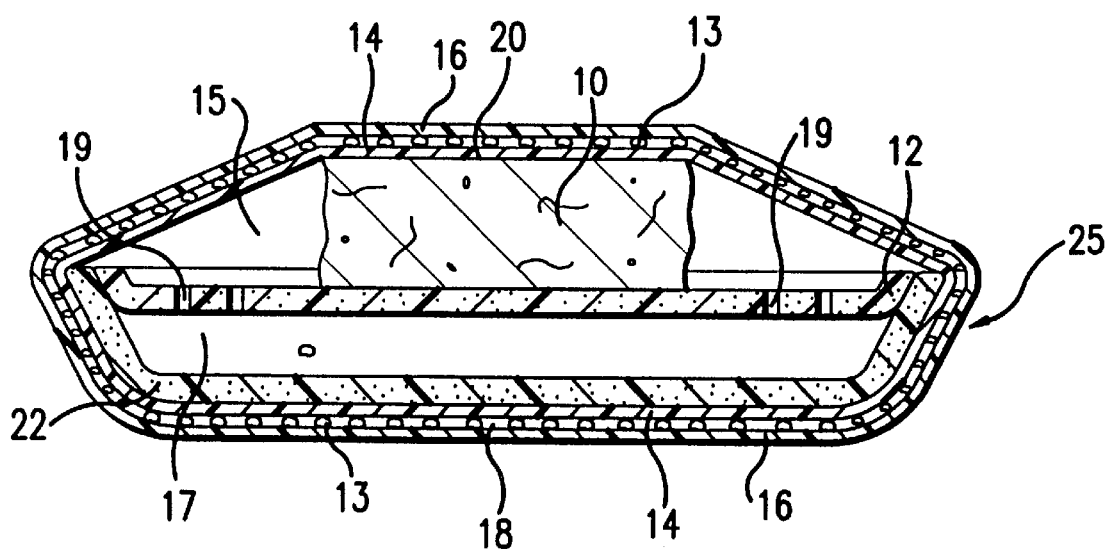
FIG. 3 illustrates a schematic cross-sectional view of an alternative embodiment of a package according to the present invention, this package also having a product therein.

Whereas FIG. 1 illustrates $O_2$-permeable film 14 sealed to edges 24 of tray 12, FIG. 3 illustrates alternative package 25, in which $O_2$-permeable film 14 and $O_2$-impermeable film 16 entirely enclose product 10 and tray 12, as well as supplemental, i.e., additional, tray 22, as further discussed below. In FIG. 3, films 14 and 16 can be applied separately as, for example, shrinkable bags, or film 14 can be applied first as a stretch-wrap with film 16 subsequently heat-shrunk around film 14 with the application of vacuum. Alternatively, films 14 and 16 can be applied together as a composite film, in the form of filmstock, or in the form of a bag, or with the films superimposed one over the other and thereafter passed through nip rolls in a manner so that the $O_2$-permeable region between the films still permits the transmission of $O_2$ through this region (i.e., spacing) between the films. In accordance with the present invention, films 14 and 16 may be applied in either manner, or any other manner, so long as gaseous oxygen can be transmitted within region 18 between the films.

Figure 5:
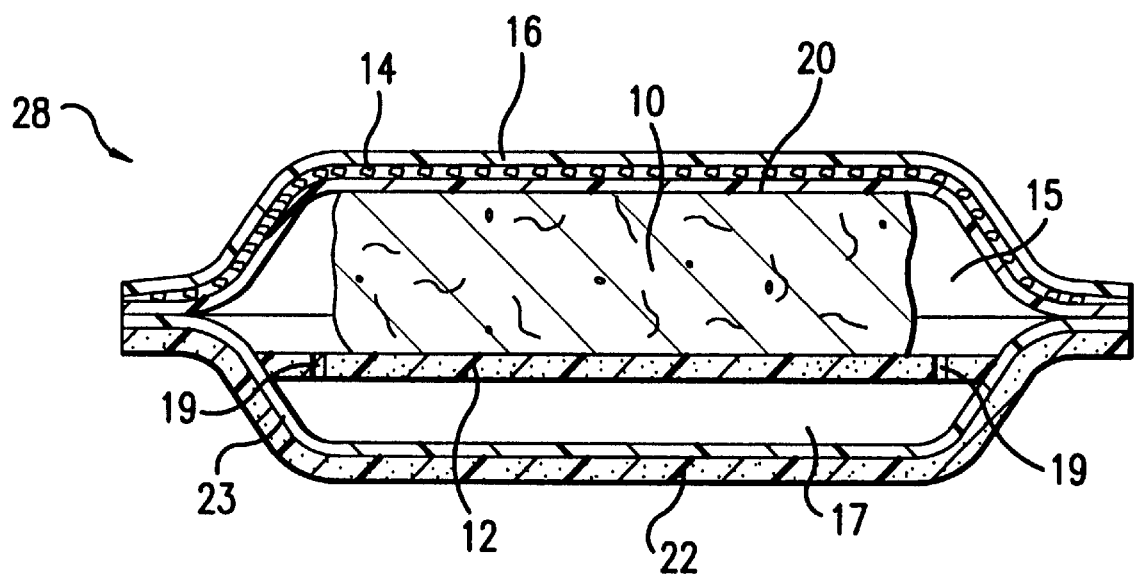
FIG. 5 illustrates a schematic cross-sectional view of another alternative embodiment of the package illustrated in FIG. 4, this package also having a product therein.
Figure 6:
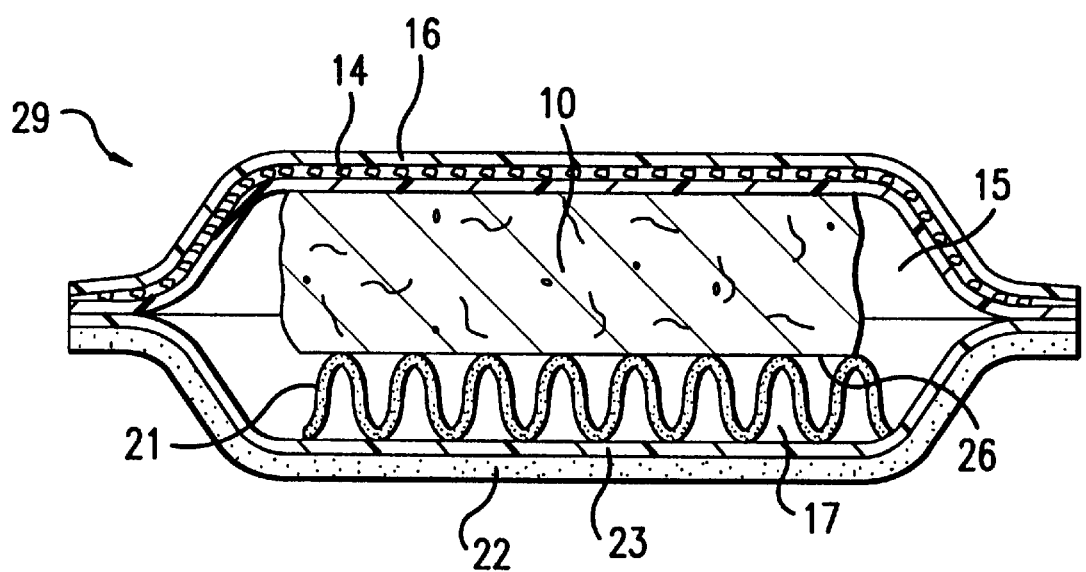
FIG. 6 illustrates a schematic cross-sectional view of another alternative embodiment of the package illustrated in FIG. 4, this package also having a product therein.

The support member can also serve to increase the gas volume within the package. Depending upon design and placement, the use of a supplemental support member may still further increase the gas volume within the package. For example, an additional tray and/or an additional rigid support member may be disposed within the package. FIG. 3 illustrates an embodiment comprising additional tray 22 for the purpose of increasing the gas volume within product-containing package 25. First tray 12 is above and within second tray 22, so that additional volume 17 between first tray 12 and second tray 22 provides additional gas within the package. In this capacity, tray 12 is preferably $O_2$-permeable, to allow gaseous oxygen to flow from additional volume 17 upward and through $O_2$-permeable tray 12, to contact meat product 10, in order to further prevent discoloration and further extend the shelf life of the meat product. Optionally, tray 12 may also be provided with perforations 19 for the purpose of $O_2$-permeability, as is illustrated in FIG. 3. FIG. 5, described further below, illustrates a similar embodiment having additional volume 17, wherein additional tray 22 further comprises $O_2$ barrier layer 23. FIG. 6 also illustrates an embodiment wherein wavy insert 21 has a corrugated shape to provide gas flow and further reduce discoloration of bottom surface 26 of meat product 10, and provide an embodiment having additional volume 17. Note that wavy insert 21 may also increase the rigidity of product-containing package 29.

Figure 4:
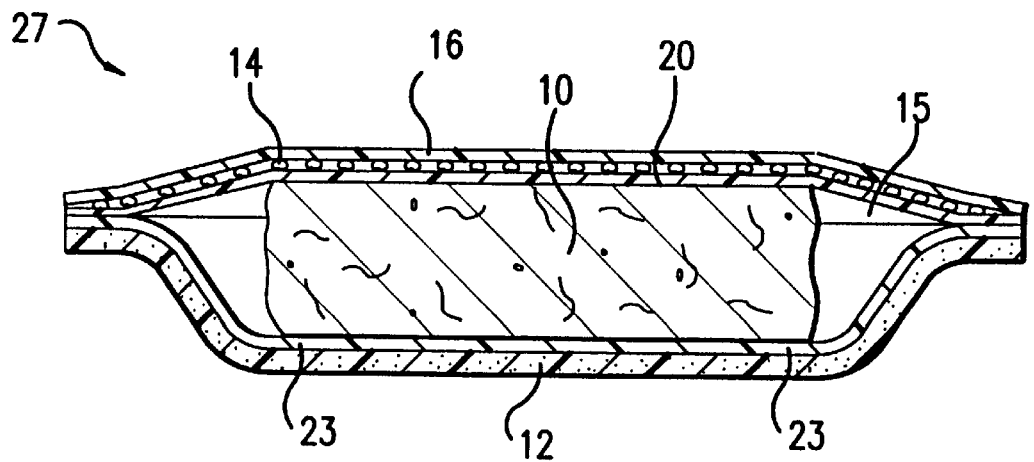
FIG. 4 illustrates a schematic cross-sectional view of another alternative embodiment of a package according to the present invention, this package also having a product therein.

FIG. 4 illustrates an alternative package according to an the present invention, wherein $O_2$-permeable film 14 and $O_2$-impermeable film 16 are nipped together, with permeable region 18 disposed therebetween, and are applied to tray 12 over product 10. Thus, film 14 is sealed to tray 12 at a perimeter thereof, and films 14 and 16 are heat-sealed to each other around the perimeter of tray 12. Tray 12 has multilayer film 23 laminated thereto, the multilayer film comprising, at a minimum, an $O_2$-impermeable layer (i.e., "barrier layer") and a sealant layer. The barrier layer may comprise any suitable $O_2$-impermeable composition, as described above. Preferably, the barrier layer comprises at least one member selected from the group consisting of polyvinylidene chloride, polymerized ethylene vinyl alcohol copolymer, amorphous nylon, polyethylene terephthalate, and the like, as discussed above regarding $O_2$-impermeable layer 16. In general, the sealant layer comprises any composition heat-sealable to $O_2$-permeable film 14, and preferably comprises at least one member selected from the group consisting of polymerized vinyl ethyl ether, polyethylene, homogeneous ethylene/alpha-olefin copolymer, ionomer, plasticized polyvinyl chloride, and the like, as known to those of skill in the art. In FIG. 4, product-containing package 27 minimizes the use of $O_2$-permeable film 14 and $O_2$-impermeable film 16, at the expense of requiring tray 12 to have laminated thereto the above-described multilayer film having a barrier layer and sealant layer.

FIG. 5 illustrates yet another embodiment of a product-containing package 28 according to the present invention, wherein supplemental product support member 22, in conjunction with product support member 12, provide additional internal volume 17 for the presence of additional gas, if needed. This additional gas includes an additional supply of gaseous oxygen for further extending the shelf life of the product. In the embodiment of FIG. 5, film 23 is laminated to the inside surface of tray 22, film 23 being a multilayer film comprising, at a minimum, an oxygen barrier layer and a sealant layer.

FIG. 6 illustrates yet another embodiment of a product-containing package 29 according to the present invention, wherein supplemental product support member 22, in conjunction with wavy product support member 21, provides additional internal volume 17 for the presence of additional gas, if needed. As in the embodiment of the package illustrated in FIG. 5, this additional gas provides an additional supply of gaseous oxygen for further extending the shelf life of product 10. In the embodiment of FIG. 6, film 23 is laminated to the inside surface of tray 22, film 23 being a multilayer film comprising, at a minimum, a barrier layer and a sealant layer.

It should be noted that the present invention is useful in any packaging wherein it is an objective to prevent any undesirable effect due to a lack of availability of gaseous oxygen to the product, where the lack of availability of gaseous oxygen is due to the close proximity of an $O_2$-impermeable film to an $O_2$-permeable film which is in close proximity to the surface of the product.

Although the package of the present invention is useful for the packaging of any oxygen-sensitive product, the package is especially suited to the packaging of meat products, including fresh red meat, fresh poultry, fresh pork, and fresh fish; preferably, fresh red meat; more preferably, fresh beef, fresh pork, fresh lamb, fresh horse, and fresh goat. Of course, this listing is inclusive of fresh processed meat derived from any one or more of the above, such as sausage containing such meat.

The present invention is illustrated by the following Example, which is provided for the purpose of representation, and is not to be construed as limiting the scope of the present invention. Unless stated otherwise, all percentages relating to gas content are by volume. Unless stated otherwise, all other percentages, parts, etc, are by weight.

EXAMPLES 1–3

Three ribeye steaks were vacuum skin packaged on a barrier foam tray, using an $O_2$-permeable film above the steaks.

In Example 1, an example according to the present invention, the $O_2$-impermeable film was a heat-shrinkable barrier bag (known as B540 (TM) barrier bag, available from W. R. Grace & Co- Conn., of Duncan, S.C. 29334), made of heat-shrinkable polyolefins and polyvinylidene chloride, and included a layer of cornstarch (known as C-3-170 Non-Offset Spray Powder (TM) cornstarch, and which, according to the manufacturer, is 99.0% foodstarch, 1% additive, this product being obtained from Varn, of Ridgewood, N.J.), in an amount of about 10 grams per 100 square inches, on the inside surface of the $O_2$-impermeable film. Other food starches which could be used include: C-5 Non-Offset Spray Powder (TM) tapioca starch, also obtainable from Varn; Micromark #20 Powdered Starch (TM) food starch, which the manufacturer (Basic Products Incorporated, of Chicago, Ill.) reports as consisting of 99% food starch and 1% additives, the food starch being a mixture of corn starch and potato starch.

The barrier bag was heat-shrunk so that the resulting package was substantially as illustrated in FIG. 1.

In Example 2, a comparative example, the $O_2$-impermeable film (a product designated as BDF 2050 (TM) heat-shrinkable thermoplastic film, available from W. R. Grace & Co. - Conn., of Duncan, S.C. 29334) comprised heat-shrinkable polyolefins and polymerized ethylene vinyl alcohol, without cornstarch on the inside surface thereof. As in Example 1, the $O_2$-impermeable film was heat-shrunk so that the resulting package was substantially as schematically illustrated in FIG. 1.

In Example 3, another comparative example, the $O_2$-impermeable film (same as in Example 1) was heat-shrunk so that no contact occurred between the bag and the vacuum skin packaged meat product. The spacing between the $O_2$-impermeable film and the $O_2$-permeable film was maintained by providing a substantial quantity of gas between the two films, i.e., enough gas so that the gap between the films was, at a minimum, at least about 0.25 inch. As such, the package of this example does not require the particulate material (i.e., cornstarch) between the films. However, because of the looseness of the outer $O_2$-impermeable film, the package was not as attractive to the consumer as a package according to the present invention.

Each package was flushed with a gas mixture comprising about 80 volume percent $O_2$ and 20 volume percent carbon dioxide. Table I illustrates the initial and subsequent amounts of $O_2$ in each package.

TABLE I

| | VOLUME PERCENT $O_2$ | | | |
|---|---|---|---|---|
| Example No. | Initial | Day 2 | Day 3 | Day 4 |
| 1 | 65 | — | 35 | 28 |
| 2 | — | — | 45 | 36 |
| 3 | 79 | — | 78 | 78 |

The packages made according to Examples 1–3 were held at 40° F. in a closed case under fluorescent light. Table II provides the results of the appearance of the packages on Day 2 and Day 3.

TABLE II

| | APPEARANCE | |
|---|---|---|
| Example No. | Day 2 | Day 3 |
| 1 (the invention) | No discoloration | darker red muscle color, no discoloration |
| 2 (comparative) | Discoloration at points at which the $O_2$-impermeable film is in close proximity to the meat surface | Discoloration at top surface |
| 3 (comparative) | No discoloration | No discoloration |

Examples 1–3 illustrate that the package of Example 1, i.e., a package according to the present invention, exhibited no discoloration after 2 days, even 3 days, even at points of close proximity of the $O_2$-impermeable film to the outside surface of the $O_2$-impermeable film which was in direct contact with the meat product. However, the results in Example 2 indicate that without the particulate composition (e.g., cornstarch) separating the $O_2$-permeable film from the $O_2$-impermeable film, the meat discolors in 2 days, under the conditions set forth above. Furthermore, the results of Example 3 indicate that the package according to the present invention (i.e., the package in Example 1) is substantially equal in discoloration performance to a package having the substantially larger gap between the $O_2$-permeable film and the $O_2$-impermeable film, i.e., the package of Example 3.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A package comprising:
   a product support member;
   a product;
   an $O_2$-permeable film over the product support member;
   an $O_2$-impermeable film over the $O_2$-permeable film and within about 0.01 to 20 mils from the $O_2$-permeable film, the $O_2$-impermeable film bounding at least a portion of a confined-$O_2$ volume within the package, the confined-$O_2$ volume comprising a gas comprising an amount of gaseous oxygen effective to inhibit discoloration of the product; and
   an $O_2$-permeable region between the $O_2$-permeable film and the $O_2$-impermeable film.

2. The package according to claim 1, wherein the $O_2$-permeable region comprises a particulate composition comprising at least one member selected from the group consisting of foodstarch and silica.

3. The package according to claim 2, wherein the foodstarch comprises at least one member selected from the group consisting of cornstarch and tapioca starch.

4. The package according to claim 3, wherein the foodstarch comprises cornstarch.

5. The package according to claim 1, wherein the gas in the $O_2$-confining interior volume comprises from about 1 to 5 cc gaseous $O_2$ per gram of product.

6. The package according to claim 5, wherein the gas in the $O_2$-confining interior volume comprises from about 1.5 to 2 cc gaseous $O_2$ per gram of product.

7. The package according to claim 1, wherein the gas in the $O_2$-confining interior volume comprises from about 60 to 99 volume percent gaseous oxygen, based on total gas volume within the $O_2$-confining interior volume, the gas further comprising at least one member selected from the group consisting of gaseous carbon dioxide and gaseous nitrogen.

8. The package according to claim 7, wherein the gas in the $O_2$-confining interior volume comprises about 80 volume percent gaseous oxygen, based on total gas volume within the $O_2$-confining interior volume.

9. The package according to claim 1, wherein the product support member comprises foam.

10. The package according to claim 1, wherein the product support member comprises at least one member selected from the group consisting of polyvinylchloride, high density polyethylene, polystyrene, polypropylene, polyethylene terephthalate, and cellulose.

11. The package according to claim 1, further comprising a supplemental product support member, wherein the product support member and the supplemental product support member together define a nonconfined-$O_2$ volume therebetween.

12. The package according to claim 11, wherein the product support member is $O_2$-permeable, and is over the supplemental product support member, and the supplemental product support member is a tray.

13. The package according to claim 10, wherein the product support member has perforations therein.

14. The package according to claim 10, wherein the product support member has an upper surface having an irregular shape.

15. The package according to claim 1, wherein the product support member has an upper surface having an irregular shape.

16. The package according to claim 1, wherein:
    the product support member has an $O_2$-impermeable film thereon;
    the $O_2$-permeable film is sealed to a perimeter of the product support member; and
    the $O_2$-impermeable film is sealed to the $O_2$-permeable film.

17. The package according to claim 1, wherein the $O_2$-permeable film has an $O_2$ transmission rate of from about 2000 to 100,000 cc/m$^2$ 24 hr atm @73° C.

18. The package according to claim 1, wherein the $O_2$-impermeable film has an $O_2$ transmission rate of from about 0 to 500 cc/m$^2$ 24 hr atm @73° C.

19. A packaged meat product, comprising:
    (A) a meat product, within
    (B) a package comprising:
        a meat product support member;
        an $O_2$-permeable film over the meat product and the product support member;
        an $O_2$-impermeable film over the $O_2$-permeable film and within about 0.01 to 20 mils from the $O_2$-permeable film, the $O_2$-impermeable film bounding at least a portion of a confined-$O_2$ volume within the package, the confined-$O_2$ volume comprising a gas comprising an amount of gaseous oxygen effective to inhibit discoloration of the product; and
        an $O_2$-permeable region between the $O_2$-permeable film and the $O_2$-impermeable film.

20. The packaged meat product according to claim 19, wherein the meat product comprises at least one member selected from the group consisting of fresh red meat, fresh poultry, fresh pork, and fresh fish.

21. The packaged meat product according to claim 20, wherein the meat product comprises fresh red meat.

22. The packaged meat product according to claim 21, wherein the $O_2$-permeable region comprises at least one member selected from the group consisting of foodstarch and silica.

23. The packaged meat product according to claim 22, wherein the $O_2$-permeable composition comprises cornstarch.

24. The packaged meat product according to claim 23, wherein the gas in the $O_2$-confining interior volume comprises from about 1 to 5 cc gaseous oxygen per gram of meat product.

25. The packaged meat product according to claim 24, wherein the gas in the confined-$O_2$ volume comprises from about 1.5 to 2 cc gaseous oxygen per gram of product.

26. The packaged meat product according to claim 24, wherein the gas in the confined-$O_2$ volume comprises from about 60 to 99 volume percent gaseous oxygen, based on total gas volume within the $O_2$-confining interior volume, the gas further comprising at least one member selected from the group consisting of carbon dioxide and gaseous nitrogen.

27. The packaged meat product according to claim 24, wherein the product support member comprises foam.

28. The packaged meat product according to claim 27, further comprising a supplemental product support member.

29. The package according to claim 2, wherein the particulate composition in the $O_2$-permeable region comprises particulates having a particle size of from about 4 to 50 microns, and wherein the particulate material is present in the O2-permeable region in an amount of from about 1 to 100 grams per 100 square inches of film.

30. The package according to claim 2, wherein the particulate composition in the $O_2$-permeable region comprises particulates having a particle size of from about 8 to 30 microns, and wherein the particulate material is present in the O2-permeable region in an amount of from about 5 to 20 grams per 100 square inches of film.

31. The package according to claim 2, wherein the particulate composition in the $O_2$-permeable region comprises particulates having a particle size of about 15 microns, and wherein the particulate material comprises cornstarch, and the particulate material is present in the O2-permeable region in an amount of about 10 grams per 100 square inches of film.

32. The packaged meat product according to claim 19, wherein the meat product has an upper surface in direct contact with an inside surface of the $O_2$-permeable film.

* * * * *